(12) United States Patent
Dutton

(10) Patent No.: US 7,800,412 B2
(45) Date of Patent: Sep. 21, 2010

(54) FAULT DETECTION AND ISOLATION OF REDUNDANT SIGNALS

(75) Inventor: Kevin E. Dutton, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 443 days.

(21) Appl. No.: 12/029,642

(22) Filed: Feb. 12, 2008

(65) Prior Publication Data

US 2009/0201050 A1 Aug. 13, 2009

(51) Int. Cl.
*H03K 5/22* (2006.01)
*G06F 11/00* (2006.01)

(52) U.S. Cl. .............................. 327/71; 714/25; 714/43; 714/56

(58) Field of Classification Search ........................ None
See application file for complete search history.

(56) References Cited

U.S. PATENT DOCUMENTS

| | | |
|---|---|---|
| 4,276,648 A | 6/1981 | Tomlinson |
| 5,202,679 A | 4/1993 | Tulpule et al. |
| 5,751,726 A | 5/1998 | Kim |
| 6,801,951 B1 | 10/2004 | Roden, III |

FOREIGN PATENT DOCUMENTS

| | | |
|---|---|---|
| EP | 0866389 | 9/1998 |
| WO | WO9217828 | 10/1992 |

OTHER PUBLICATIONS

Blough et al., "A Comparison of Voting Strategies for Fault-Tolerant Distributed Systems", Oct. 9, 1990, pp. 136-145, Publisher: IEEE COMP.
European Patent Office, "European Search Report", May 14, 2009, Published in: EP.
Price C. E., "Fault Tolerant Avionics for the Space Shuttle", Oct. 14, 1991, pp. 203-206.

*Primary Examiner*—Kevin L Ellis
*Assistant Examiner*—Guerrier Merant
(74) *Attorney, Agent, or Firm*—Fogg & Powers LLC

(57) ABSTRACT

A method of detecting signal faults comprises sampling at least three redundant signals; calculating a difference signal for each unique pair-wise comparison of the at least three sampled redundant signals; comparing each difference signal to an expected distribution for the difference signals; and determining if one of the at least three redundant signals is faulty based on the comparison of each difference signal to the expected distribution.

20 Claims, 5 Drawing Sheets

FAULT DETECTION AND ISOLATION OF REDUNDANT SIGNALS

GOVERNMENT LICENSE RIGHTS

The U.S. Government may have certain rights in the present invention as provided for by the terms of contract FA8626-06-C-2065 awarded by the United States Navy.

BACKGROUND

Many systems, such as navigation and control systems, have a need to determine if a signal input is faulty. Consequently, many different techniques have been developed to detect a faulty signal. For example, some systems use a mid-value select technique. The mid-value select technique attempts to select a value from a plurality of inputs which meets a pre-defined definition for a mid-value of the plurality of inputs. Most mid-value select techniques assume that the redundant signals used match exactly if non-faulty. However, given slight variations in circuit elements and signal path, noise can be inserted into individual signals. Due to the slight variation, non-faulty redundant signals cannot be guaranteed to match exactly. Thus, mid-value select techniques have some limitations in detecting faults.

For the reasons stated above, and for other reasons stated below which will become apparent to those skilled in the art upon reading and understanding the present specification, there is a need in the art for a fault detection system which accounts for variations in the sensor signals.

SUMMARY

The above mentioned problems and other problems are resolved by the present invention and will be understood by reading and studying the following specification.

In one embodiment, a method of detecting signal faults is provided. The method comprises sampling at least three redundant signals; calculating a difference signal for each unique pair-wise comparison of the at least three sampled redundant signals; comparing each difference signal to an expected distribution for the difference signals; and determining if one of the at least three redundant signals is faulty based on the comparison of each difference signal to the expected distribution.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

In accordance with common practice, the various described features are not drawn to scale but are drawn to emphasize specific features relevant to the present invention. Like reference numbers and designations in the various drawings indicate like elements.

DETAILED DESCRIPTION

Figure 1:
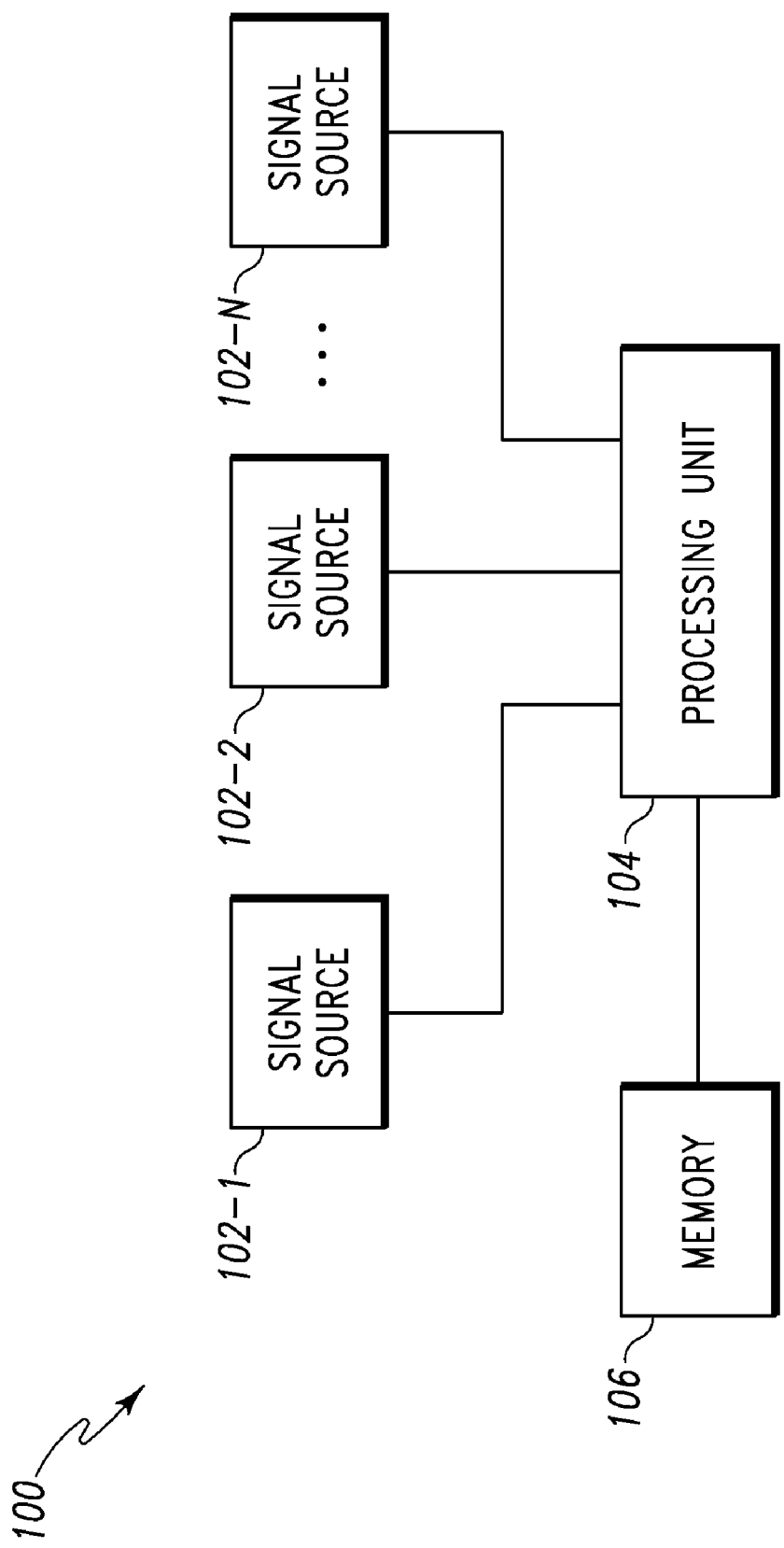
FIG. 1 is a block diagram of a fault detection system according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

Embodiments of the present invention enable detection of faulty signals without requiring that each redundant signal match exactly the other redundant non-faulty signals. In particular, faulty signals are detected without the need to know the true value of the signal. This is accomplished through a comparison of difference signals to an expected distribution as described below.

FIG. 1 is a block diagram of a fault detection system 100 according to one embodiment of the present invention. Fault detection system 100 includes at least three redundant signal sources 102-1 . . . 102-N (where N is the total number of signal sources), a processing unit 104 and a memory 106. Processing unit 104 samples signals from the at least three redundant signal sources 102-1 . . . 102-N. In the absence of faults all three signals will be approximately the same. However, some variation often occurs due to noise along the different signal paths, characteristics of the circuits used in each signal source, etc. Thus, samples from non-faulty signals received from each signal source 102-1 . . . 102-N lie in a distribution of non-faulty signals. The distribution can be a Gaussian distribution, uniform distribution, etc., based on the specific implementation and environment.

The expected distribution can be determined through empirical studies or through mathematical calculations. By knowing the distribution for the original signals from signal sources 102-1 . . . 102-N, the distribution of differences between any two of the signal sources 102-1 . . . 102-N can also be determined. For example, if the distribution of the original signals from signal sources 102-1 . . . 102-N is a Gaussian distribution, the distribution of the pair-wise comparison differences is also Gaussian with the same variances as the distribution of the original signals. Memory 106 stores the difference distributions for each pair-wise comparison of signals from signal sources 102-1 . . . 102-N. A pair-wise comparison is a comparison of signals from two of the at least three signal sources 102-1 . . . 102-N. For N total signal sources, the number of unique pair-wise comparisons is given by the equation:

$$\frac{N!}{2 \cdot (N-2)!}$$

Thus, for three signal sources 102 as shown in FIG. 1, there are three unique pair-wise comparisons. In particular, a difference signal is calculated for each of: the comparison between signal source 102-1 and 102-2 (comparison 1), the comparison between signal source 102-1 and 102-N (comparison 2), and the comparison between signal source 102-2 and 102-N (comparison 3). For purposes of explanation, it is assumed that each calculated difference signal follows the exemplary Gaussian distribution 403 shown in FIG. 4 if each signal from signal sources 102-1 . . . 102-N is non-faulty. It should be noted that the values in FIG. 4 are provided by way of example only and that actual values may vary based on the details of each implementation of embodiments of the present invention.

Figure 4:
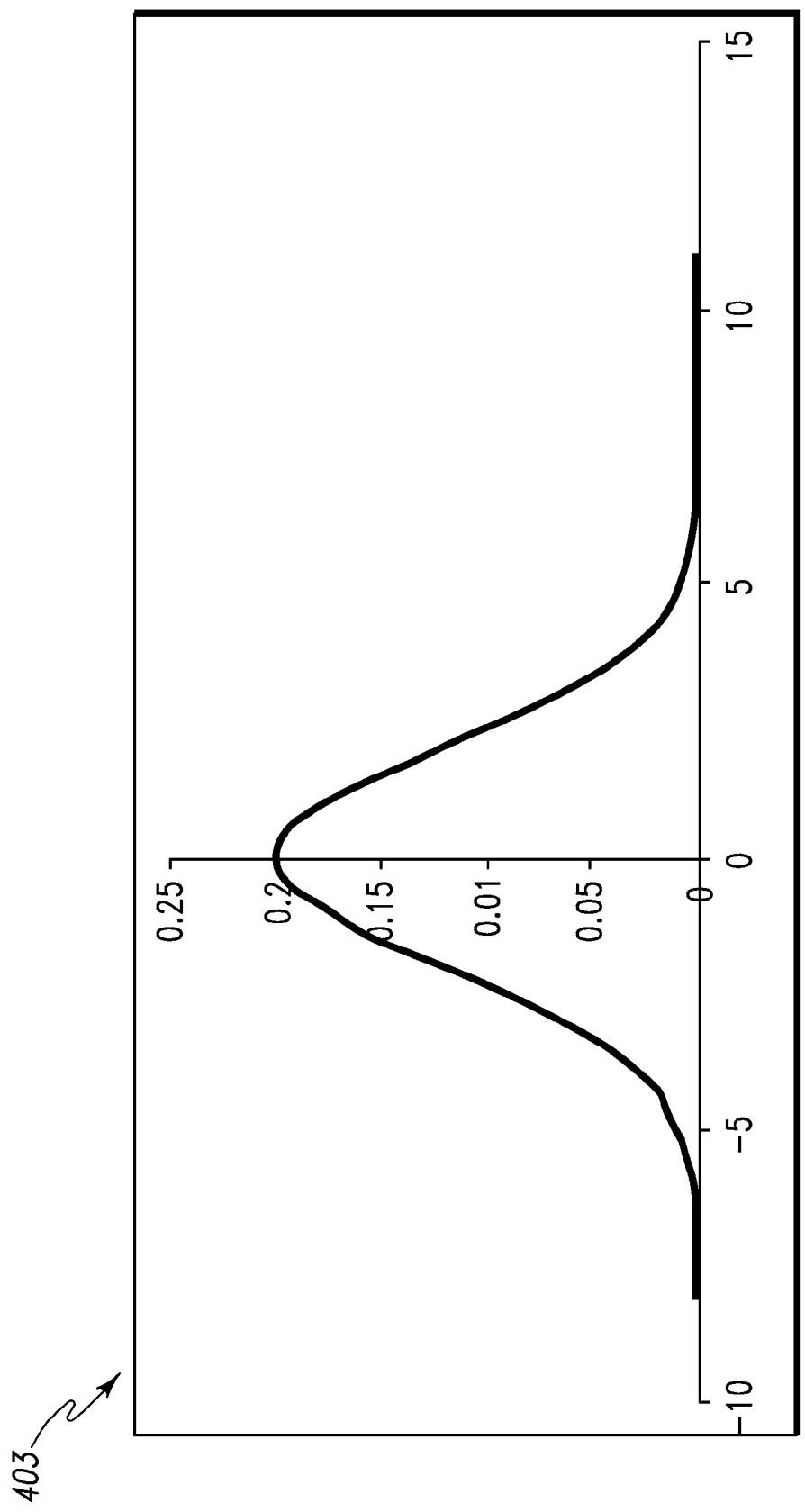
FIG. 4 is a graph of an exemplary difference signal distribution.

As shown in FIG. 4, the difference distribution for non-faulty signals has a mean of zero since the original signals are redundant. However, if one of signal sources 102-1 . . . 102-N produces a faulty signal, N−1 of the difference signals will not follow the expected distribution, where N is the total number of signal sources. In this example, two of the difference signals do not follow the distribution 403 if one of signal sources 102-1 . . . 102-N is faulty. For example, if signal source 102-1 produces a faulty signal, the difference signal for the pair-wise comparisons 1 and 2 above do not fit the Gaussian distribution 403. By determining which signal source is common to both comparisons 1 and 2, the fault can be traced back to the faulty signal source (signal source 102-1 in this example).

In operation, processing unit 104 performs the pair-wise comparison of the signals sampled from signal sources 102-1 . . . 102-N to calculate the difference signals. In addition, processing unit 104 determines if the difference signals fit an expected distribution using techniques known to one of skill in the art. If N−1 of the difference signals do not fit the expected distribution, processing unit 104 traces the error back to the faulty signal source as described above. Processing unit 104 then isolates the signals from the faulty signal source such that the faulty signals do not influence further processing. For example, if fault detection system 100 is used in a navigation system, the faulty signal is not used by processing unit 104 in performing navigation calculations.

Instructions for causing processing unit 104 to sample redundant signals, calculate difference signals and fit difference signals to an expected distribution are typically tangibly embodied on any appropriate medium used for storage of computer readable instructions or data structures. Computer readable media can be any available media that can be accessed by a general purpose or special purpose computer or processor, or any programmable logic device. Suitable computer readable media may include storage media or memory media such as magnetic or optical media, e.g., disk or CD-ROM, volatile or non-volatile media such as RAM (e.g. SDRAM, DDR SDRAM, RDRAM, SRAM, etc.), ROM, EEPROM, flash memory, etc. as well as transmission media or signals such as electrical, electromagnetic, or digital signals, conveyed via a communication medium such as network and/or a wireless link. For example, in this embodiment, the instructions are stored on memory 106.

Figure 2:
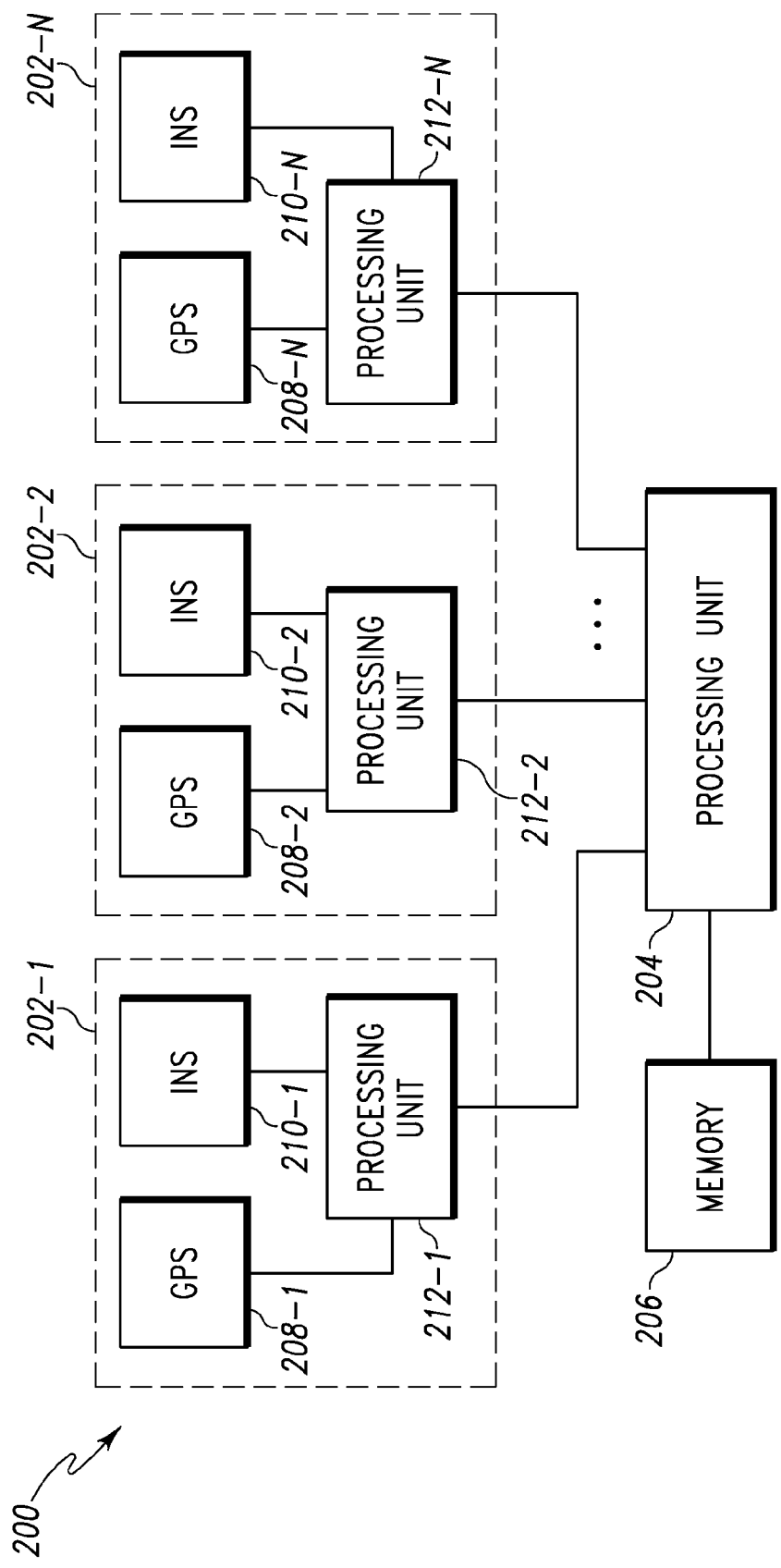
FIG. 2 is a block diagram of a fault detection system according to another embodiment of the present invention.

FIG. 2 is a block diagram of a fault detection system 200 according to another embodiment of the present invention. Fault detection system 200 includes signal sources 202-1 . . . 202-N, processing unit 204, and memory 206 as described above with respect to FIG. 1. In particular, each of signal sources 202-1 . . . 202-N includes a global positioning system (GPS) sensor 208, an inertial navigation system (INS) sensor 210, and a processing unit 212. Processing unit 212 blends signals from GPS sensor 208 and INS sensor 210. For example, in some embodiments, processing unit 212 uses a Kalman filter. However, it is to be understood, that in other embodiments, other techniques can be used to combine signals from GPS sensor 208 and INS sensor 210. A combined signal is then provided from each of signal sources 202-1 . . . 202-N to processing unit 204. Processing unit 204 then determines if one of signal sources 202-1 . . . 202-N is faulty as described above.

Figure 3:
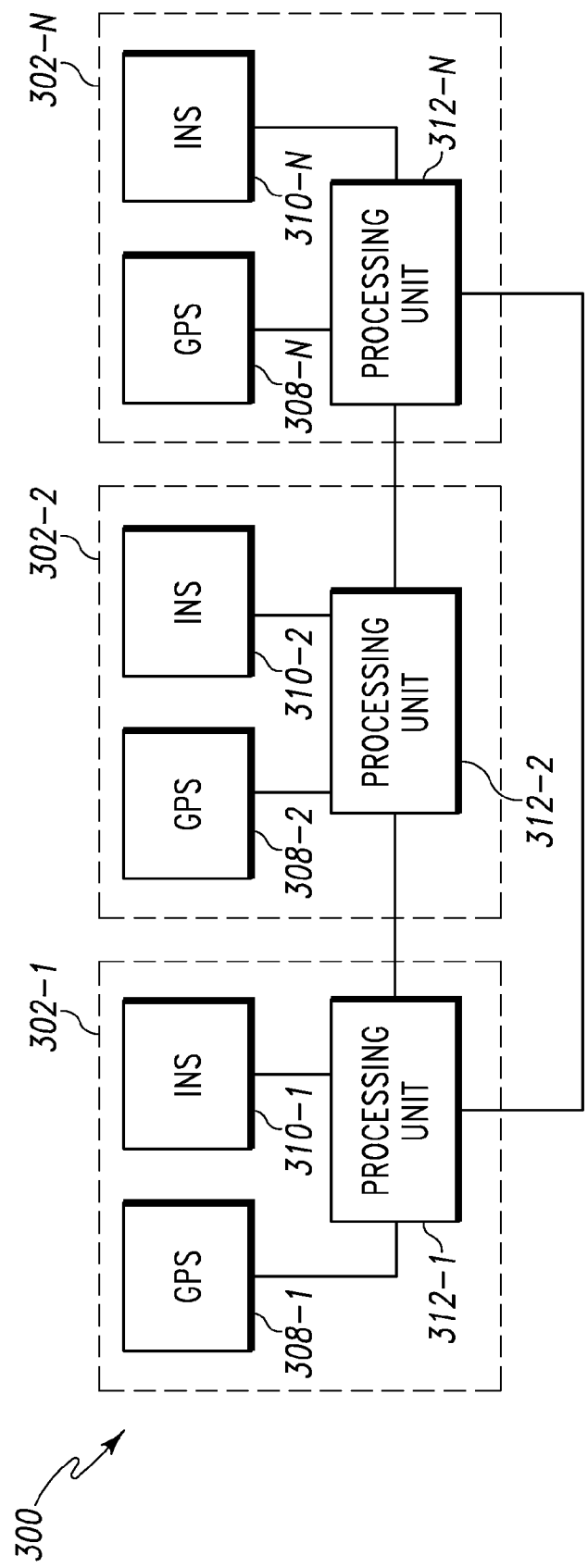
FIG. 3 is a block diagram of a fault detection system according to another embodiment of the present invention.

FIG. 3 is a block diagram of another embodiment of a fault detection system 300. In fault detection system 300, each of signal sources 302-1 . . . 302-N includes a processing unit 312. In the embodiment of FIG. 3, each processing unit 312-1 . . . 312-N is coupled to and shares its data with the other processing units 312. Each processing unit 312-1 . . . 312-N calculates pair-wise combination difference signals and determines if there is a faulty signal as described above with respect to processing unit 104 in FIG. 1. In some such embodiments, one of signal sources 302-1 . . . 302-N is designated as the master signal source and only its data is provided to other systems and components. If the master is determined to be faulty, one of the remaining signal sources is selected to transmit its data. For example, the decision of which signal source replaces the designated master can be determined a priori. Hence, a faulty signal source is isolated from transmitting its data to other systems and components.

Additionally, each signal source 302-1 . . . 302-N includes a GPS sensor 308 and an INS sensor 310. Processing unit 312 in each signal source 302-1 . . . 302-N blends signals from GPS sensor 308 and INS sensor 310. As stated above, processing unit 312 blends the signals using a Kalman filter or other comparable technique for blending signals. A combined signal is then provided from the processing unit 312 in each of signal sources 302-1 . . . 302-N to the processing unit of each of the other signal sources. Each processing unit 312 then calculates the pair-wise combination difference signals, as described above, on the blended signals.

Figure 5:
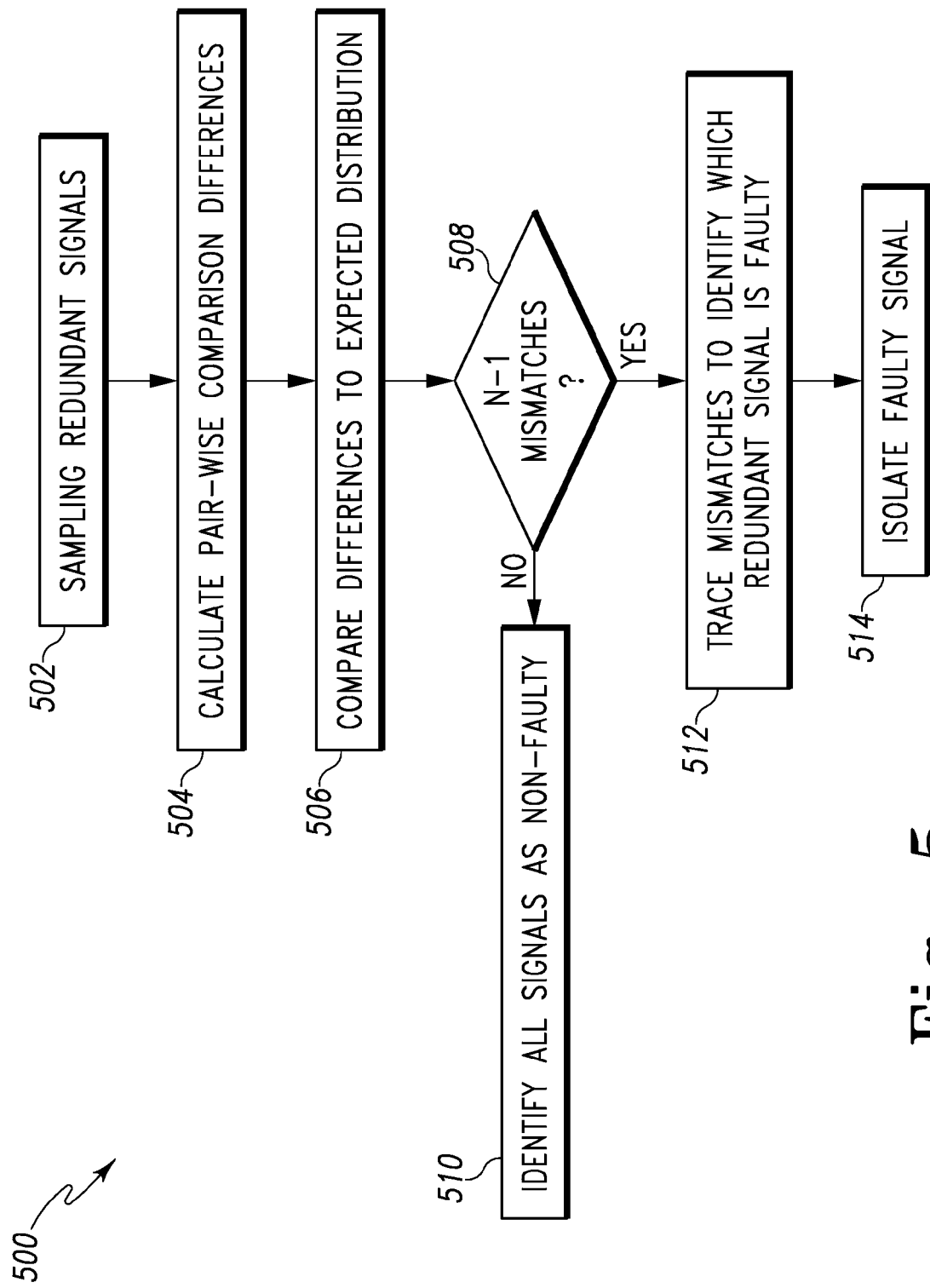
FIG. 5 is a flow chart of a method of detecting faults in redundant signals according to one embodiment of the present invention.

FIG. 5 is a flow chart of a method 500 of detecting faults in redundant signals according to one embodiment of the present invention. Method 500 is implemented by a processing unit such as processing unit 104 in FIG. 1 above. At 502, at least three redundant signals are received. The three redundant signals are each a blended signal produced from a GPS sensor and an INS sensor in some embodiments. At 504, a difference signal for each unique pair-wise combination is calculated. At 506, the difference signals are compared to an expected distribution. The expected distribution is based on the specific implementation. In some embodiments, the distribution is a Gaussian distribution as described above. The expected distribution is derived from the known distribution of original signals.

At 508, it is determined if there are N−1 mismatches between the difference signals and the expected distribution, where N is the total number of redundant signals. Even if there are one or more mismatches, if the total number of mismatches is less than N−1, no action is taken and all signals are treated as non-faulty at 510. If there are N−1 mismatches, however, the processing unit traces the mismatches to identify which signal is faulty at 512. In particular, the processing unit identifies which signal is common to each difference signal which does not fit the expected distribution. The difference signals are fit to the expected distribution using techniques known to one of skill in the art. At 514, the processing unit identifies the signal in common as the faulty signal. In particular, in some embodiments, identifying the signal as faulty comprises isolating the signal such that it is not included in further processing by the processing unit. In other embodiments, the processing unit informs other processing units which signal is faulty. For example, in some such embodiments, a flag is set to indicate the faulty signal.

Hence, embodiments of the present invention are able to detect faulty signals by fitting difference signals to an expected distribution. In particular, embodiments of the present invention are able to determine faulty signals without needing to determine the true value of the original signals.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of detecting signal faults, the method comprising:
    sampling at least three redundant signals;
    calculating a difference signal for each unique pair-wise comparison of the at least three sampled redundant signals;
    comparing each difference signal to an expected distribution for the difference signals; and
    determining if one of the at least three redundant signals is faulty based on the comparison of each difference signal to the expected distribution.

2. The method of claim 1, further comprising deriving the expected distribution for the difference signals from a known distribution of the at least three redundant signals.

3. The method of claim 1, wherein determining if one of the at least three redundant signals is faulty when the total number of difference signals which do not fit the expected distribution equals the total number of redundant signal minus one.

4. The method of claim 1, further comprising identifying the faulty signal by identifying the redundant signal used to calculate each of the difference signals which does not fit the expected distribution.

5. The method of claim 4, further comprising isolating the identified faulty signal from inclusion in further processing.

6. The method of claim 4, wherein identifying the faulty signal comprises setting a flag to identify the faulty signal.

7. A system comprising:
    at least three signal sources configured to provide redundant signals;
    a memory configured to store an expected distribution of difference signals; and
    at least one processing unit configured to calculate a difference signal for each pair-wise comparison of the redundant signals from the at least three signal sources, the at least one processing unit further configured to determine if one of the at least three signal sources is faulty by fitting the difference signals to the expected distribution.

8. The system of claim 7, wherein the at least one processing unit is further configured to derive the expected distribution for the difference signals from a known distribution of the redundant signals from the at least three signal sources.

9. The system of claim 7, wherein the at least one processing unit is further configured to determine if one of the at least three redundant signals is faulty when the total number of difference signals which do not fit the expected distribution equals the total number of signal sources minus one.

10. The system of claim 7, wherein the at least one processing unit is further configured to identify a faulty signal source by identifying the redundant signal used to calculate each of the difference signals which does not fit the expected distribution.

11. The system of claim 7, wherein each of the signal sources comprises:
    a global positioning system (GPS) sensor;
    an inertial navigation system (INS) sensor; and
    a processing unit configured to combine signals from the GPS sensor with signals from the INS sensor.

12. The system of claim 11, wherein the processing unit in each of the signal sources is configured to combine the GPS sensor signals with the INS sensor signals using a Kalman filter.

13. The system of claim 7, wherein the at least one processing unit comprises a processing unit in each of the at least three signal sources.

14. The system of claim 13, wherein one of the at least three signal sources is designated as a master, wherein only the master transmits its data to other systems and components.

15. A program product comprising program instructions embodied on a storage medium for execution by a programmable processor, wherein the program instructions are operable to cause the programmable processor to: sample at least three redundant signals; calculate a difference signal for each unique pair-wise comparison of the at least three sampled redundant signals; compare each difference signal to an expected distribution for the difference signals; and determine if one of the at least three redundant signals is faulty based on the comparison of each difference signal to the expected distribution.

16. The program product of claim 15, wherein the program instructions are operable to cause the programmable processor to derive the expected distribution for the difference signals from a known distribution of the at least three redundant signals.

17. The program product of claim 15, wherein the program instructions are operable to cause the programmable processor to determine if one of the at least three redundant signals is faulty when the total number of difference signals which do not fit the expected distribution equals the total number of redundant signal minus one.

18. The program product of claim 15, wherein the program instructions are operable to cause the programmable processor to identify the faulty signal by identifying the redundant signal used to calculate each of the difference signals which does not fit the expected distribution.

19. The program product of claim 18, wherein the program instructions are operable to cause the programmable processor to isolate the identified faulty signal from inclusion in further processing.

20. The program product of claim 18, wherein the program instructions are operable to cause the programmable processor to set a flag to identify the faulty signal.

* * * * *